S. N. SANFORD.
Car Starter.
No. 27,742.
Patented Apr. 3, 1860.
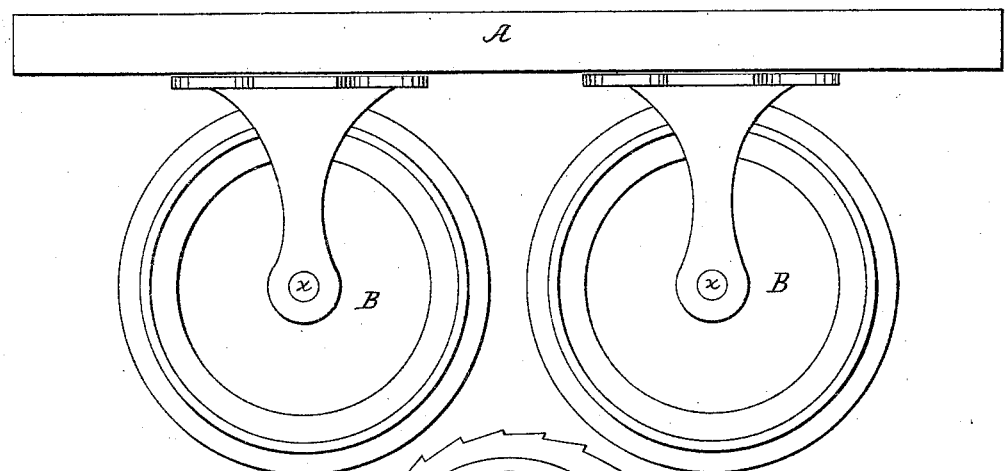
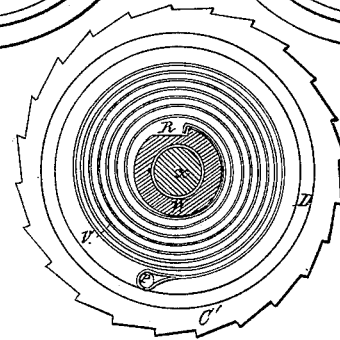
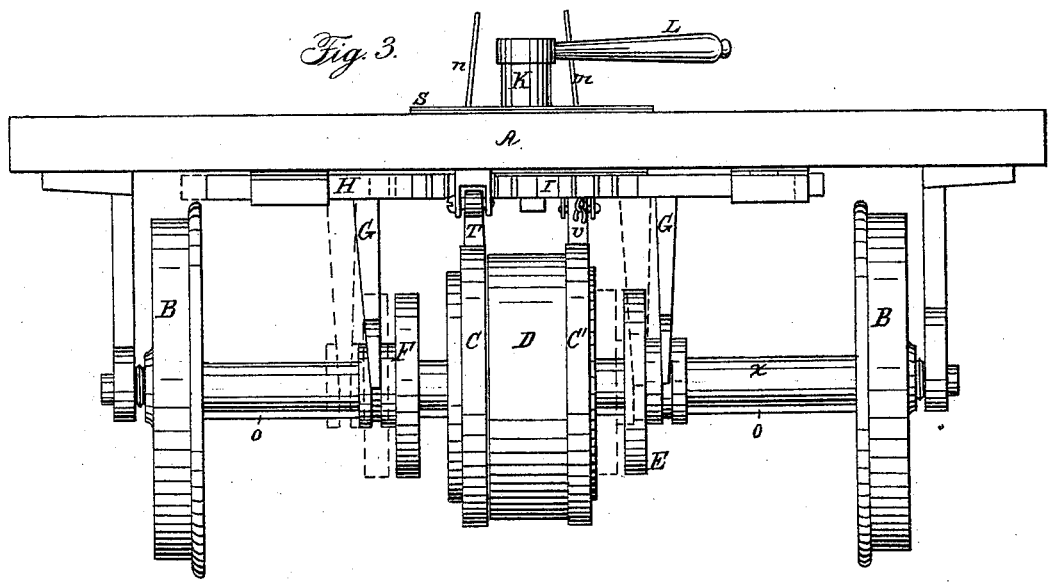

UNITED STATES PATENT OFFICE.

SOLOMON N. SANFORD, OF CLEVELAND, OHIO.

APPARATUS FOR STARTING CITY-RAILROAD CARS.

Specification of Letters Patent No. 27,742, dated April 3, 1860.

*To all whom it may concern:*

Be it known that I, SOLOMON N. SANFORD, of Cleveland, in the county of Cuyahoga and State of Ohio, have invented a new and useful Improvement in Starter-Brakes; and I do hereby declare that the following is a full and exact description thereof, reference being had to the accompanying drawings and to the letters of reference marked thereon.

My invention consists in an improvement in starter brakes. In this class of brakes a spring or springs have been employed in various ways to check the motion of running gear, and the tension of the springs thus produced has been applied to starting said running gear or increasing its speed.

In the accompanying drawings Figure 1 represents a common running gear for railroads. Fig. 3 is a front view of the same with my improvements attached. Fig. 2 is a view of detached parts hereafter to be explained.

My invention is especially intended for street railroads upon which horses are used but it may be applied to omnibuses or other running gear at pleasure.

In the accompanying drawings, Fig. 1, the car body or platform A, is supported on four wheels B, in the usual manner, the axles X, revolving with the wheels B. Upon the forward axle is placed a drum D, which embraces, guides and protects the spring V, Fig. 2. The heads of this drum consist of ratchet wheels C, and C'. The wheel C' is cast with the part D, and has a pin P, Fig. 2, to which one end of the spring V, is attached. The other wheel C, is cast separate from D and has a sleeve W, Fig. 2 fitting the axle X, and provided with a notch or catch R, Fig. 2, which holds the inner end of the spring V, this end of the spring being bent like a hook. This drum D, and both of the ratchet wheels may revolve independently of the axle X, and the ratchet wheels may revolve independently of each other. As one end of the spring V, is attached to wheel C, and the other end of said spring is attached to wheel C', the spring may be coiled or uncoiled by holding one of said wheels stationary and revolving the other wheel. When said spring is coiled up its tension is maintained by two dogs T and U, until one of these dogs is raised thus releasing the ratchet and one end of the spring V.

Upon the axle X, are two friction clutches. E, F, Fig. 3. These clutches are capable of sliding along the axle X, but they are prevented from revolving on said axle, by means of feathers o, o, which fit into grooves in the axle, and also in the clutches E, F. By turning the lever L, to the right or left, the shaft K, and pinion I, are set in motion thus communicating motion to the ratchet bar H, the arms G, and the clutches E, F. In this manner one of the clutches may be pressed against one of the ratchet wheels as shown in red lines in Fig. 3, and the revolving motion of wheels B, and axle X, be thus communicated to one of the ratchet wheels, while the action of the spring V, checks the speed of wheels B, the spring itself being wound up like the spring of a clock. As the speed of the running gear is thus checked the spring V, is held under high tension by the dogs T, U. Then by bringing the other clutch into action upon the ratchet wheel connected with the other end of the spring V, the force of this spring may be employed in starting the running gear or increasing its speed. As the dogs T, and U, act in opposite directions and are usually engaged with the ratchet wheels C, C', either clutch may be employed in checking the speed of the running gear according to the direction in which the car is moving, whether forward or backward.

When the spring is wound up the car may yet run in either direction independently of said spring so long as the clutches are kept clear of the ratchet wheels. The dogs T, and U are released by pulling up rods m, n, which are held by catch spring S. The spring V, when under high tension, slips over catch R, without breaking. My invention may be used with steam or other power several springs being employed if necessary. The drum may be varied in form and the other parts somewhat varied without departing from my invention so long as substantially the same effect is produced.

I am aware that a drum inclosing a flat spring has been used on the common shaft of car brakes and that a tube has been employed to inclose a spiral spring upon an axle; but my arrangement is very different in its practical effects. With my arrangement the drum gives a great leverage upon the axle by the attachment of the spring far from the center. My drum is in two parts—or the drum has two detached heads which is not the case with others. These heads enable the spring to be held under high tension while the axle may revolve. With my arrangement larger springs or several springs may be employed and yet conveniently packed upon the axle without encumbrance. This could not be done with other arrangements heretofore known. Above all my springs cannot be broken and yet their highest power may be applied constantly to the axle, which is not the case with other starter brakes.

I do not claim the separate mechanical devices above described but confine my claims to the improvements in starter brakes herein described and claimed.

Having thus fully described my invention what I claim and desire to secure by Letters Patent of the United States is:

1. The use of the spring V, when attached to notch R, in order to release itself under high tension thus checking the running gear without breaking the spring substantially as set forth.

2. I claim the arrangement of the drum D, provided with the two independently revolving heads C, and C′ in combination with the spring V, and axle X all operating together with the dogs T, and U, substantially as set forth for the purposes specified.

3. I claim the peculiar arrangement of the friction clutches E, and F, arms G, ratchet bar H, pinion I, and shaft K, in combination with the drum D, spring V, and axle X, substantially as described for the purposes set forth.

SOLOMON N. SANFORD.

Witnesses:
EDW. F. BROWN,
DANIEL BREED.